(12) United States Patent
Behuria et al.

(10) Patent No.: US 9,542,467 B2
(45) Date of Patent: *Jan. 10, 2017

(54) EFFICIENTLY FIRING MAPPING AND TRANSFORM RULES DURING BIDIRECTIONAL SYNCHRONIZATION

(71) Applicant: International Business Machines Corporation, Armonk, NY (US)

(72) Inventors: Ajay K. Behuria, Bentonville, AR (US); James E. Bostick, Cedar Park, TX (US); John M. Ganci, Jr., Cary, NC (US); Souvik Majumdar, Kolkata (IN); Shuvamoy Saha, Bentonville, AR (US); David S. Wenk, Byron Center, MI (US)

(73) Assignee: International Business Machines Corporation, Armonk, NY (US)

( * ) Notice: Subject to any disclaimer, the term of this patent is extended or adjusted under 35 U.S.C. 154(b) by 597 days.

This patent is subject to a terminal disclaimer.

(21) Appl. No.: 14/082,375

(22) Filed: Nov. 18, 2013

(65) Prior Publication Data

US 2015/0142737 A1    May 21, 2015

(51) Int. Cl.
*G06F 7/00* (2006.01)
*G06F 17/00* (2006.01)
*G06F 17/30* (2006.01)

(52) U.S. Cl.
CPC .............. *G06F 17/30578* (2013.01)

(58) Field of Classification Search
CPC ............ G06F 17/30575; G06F 17/30507; G06F 17/30356; G06F 8/71
(Continued)

(56) References Cited

U.S. PATENT DOCUMENTS 7,516,157 B2   4/2009   Cameron et al.
7,584,422 B2   9/2009   Ben-Yehuda et al.
(Continued)

FOREIGN PATENT DOCUMENTS

WO     2005/024626     3/2005

OTHER PUBLICATIONS

Office Action (Dec. 24, 2015) for U.S. Appl. No. 14/082,290, filed Nov. 18, 2013.
(Continued)

*Primary Examiner* — Binh V Ho
(74) *Attorney, Agent, or Firm* — Schmeiser, Olsen & Watts, LLP; Michael Petrocelli

(57) ABSTRACT

A method and associated system for efficiently firing mapping and transform rules during a bidirectional synchronization of two or more systems. A processor loads a set of mapping and transform synchronization rules and a set of cross-reference tables. When an event message received from a source system identifies a revision to an element of the source system's data, the processor parses the message to identify the revised source-system data. The processor uses the cross-references to identify synchronization rules that are associated with the revised data element. If any of the identified rules requires an additional source-system data element or an extrinsic data element located at an external source, the processor retrieves those further identified data elements. The processor then looks up the synchronization procedure of the identified rules, packages it into a synchronization message, and sends the message to the target system.

20 Claims, 3 Drawing Sheets

(58) Field of Classification Search
USPC .......................................................... 707/613
See application file for complete search history.

(56) References Cited

U.S. PATENT DOCUMENTS

| | | | |
|---|---|---|---|
| 7,672,957 | B2 | 3/2010 | Cotichini et al. |
| 2008/0098042 | A1* | 4/2008 | Tian ...................... H04L 7/0004 |
| 2008/0162728 | A1* | 7/2008 | Robeal ................ H04L 67/1095 |
| | | | 709/248 |
| 2009/0037492 | A1* | 2/2009 | Baitalmal ......... G06F 17/30575 |
| 2009/0077002 | A1* | 3/2009 | Clark ................... G06Q 10/107 |
| | | | 706/59 |
| 2009/0164491 | A1 | 6/2009 | Cotichini et al. |
| 2009/0222834 | A1* | 9/2009 | Gill ......................... G06F 9/468 |
| | | | 718/104 |
| 2009/0287726 | A1* | 11/2009 | Verhoeven ........ G06F 17/30581 |
| 2010/0057759 | A1 | 3/2010 | Cotichini et al. |
| 2010/0083221 | A1 | 4/2010 | Naik et al. |
| 2010/0235321 | A1 | 9/2010 | Shukla et al. |
| 2011/0145187 | A1* | 6/2011 | Himmelsbach ... G06F 17/30578 |
| | | | 707/610 |
| 2011/0166849 | A1 | 7/2011 | Dube et al. |
| 2011/0218964 | A1* | 9/2011 | Hagan ............... G06F 17/30581 |
| | | | 707/626 |
| 2011/0276636 | A1 | 11/2011 | Cheng et al. |
| 2012/0240185 | A1 | 9/2012 | Kapoor et al. |

OTHER PUBLICATIONS

Amendment (Jan. 28, 2016) for U.S. Appl. No. 14/082,290, filed Nov. 18, 2013.
Notice of Allowance (Mar. 17, 2016) for U.S. Appl. No. 14/082,290, filed Nov. 18, 2013.
Office Action (Sep. 3, 2015) for U.S. Appl. No. 14/082,548, filed Nov. 18, 2013.
Amendment (Nov. 23, 2015) for U.S. Appl. No. 14/082,548, filed Nov. 18, 2013.
Notice of Allowance (Mar. 17, 2016) for U.S. Appl. No. 14/082,290.
Len Erlikh, Integration, Leveraging Legacy System Dollars for E-Business, 1520-9202/001 copyright 2000 IEEE, May/Jun. 2000 IT Pro, pp. 17-23.
Arsanjani et al., Web, Mar. 2003 Queue, Copyright 2003 ACM 1542-7730/03/0300, pp. 48-58.
Kane et al., ip.com, A systolic Design Rule Checker, Publication Date Jul. 31, 1983, IP.com No. IPCOM000151824D, 30 pages.
ip.com, Analyzing and Decomposing a Plurality of Rules, IP.com No. IPCOM000166751D, IP.com Electronic Publication: Jan. 21, 2008, Authors: Disclosed Anonymously, 38 pages.
IBM, ip.com, Social Net Data Mining for Business Environments, Original Publication Date: Jul. 18, 2006, IP.com No. IPCOM000138435D, 3 pages.
ip.com, System and Method for Requirements and Capabilities Pairing via Self-Learning Analytical Engine, IP.com No. IPCOM000226901D, IP.com Electronic Publication: Apr. 23, 2013, Authors: Disclosed Anonymously, 4 pages.
U.S. Appl. No. 14/082,290, filed Nov. 18, 2013, First Named Inventor Ajay K. Behuria.
U.S. Appl. No. 14/082,548, filed Nov. 18, 2013, First Named Inventor Ajay K, Behuria.
Notice of Allowance (Aug. 17, 2016) for U.S. Appl. No. 15/148,355.

* cited by examiner

US 9,542,467 B2

EFFICIENTLY FIRING MAPPING AND TRANSFORM RULES DURING BIDIRECTIONAL SYNCHRONIZATION

TECHNICAL FIELD

The present invention relates to increasing the efficiency of a mechanism for synchronizing the operation or stored data of two or more software applications, computer systems, or other electronic systems.

BACKGROUND

Implementing or deploying a new software, hardware, communications, or other type of electronic system may comprise a transition phase during which one or more legacy systems and one or more new systems are concurrently, simultaneously, or in parallel. A pair of systems may also be run concurrently, simultaneously, or in parallel for other reasons, such as when comparing the accuracy of two or more systems or when measuring relative efficiency of systems that comprise different methods.

It may be necessary in such cases to ensure that the systems are monitored by a synchronization means that may perform functions like resolving differences between a pair of data models that each represent one or more data structures (each of which comprise one or more logical data elements) comprised by one of the systems, resolving inconsistencies between each system's repository of production data, or ensuring that, when fed identical or analogous input, a component of a first system and an analogous component of a second system correctly produce identical, similar, or analogous output.

A synchronization means may comprise a mechanism by which a monitoring entity detects a revision to production data stored by a first system or detects a revision to a data model or other data structure that represents an organization of the production data. This monitoring entity may be a hardware or software component of one of the systems being synchronized or it may be a distinct "intermediary" hardware or software entity.

Such a monitoring entity may respond to a detection of a first revision or set of revisions to a first system by making a second revision or set of revisions to a second system, in order to synchronize, a data model, or an element of production data of the first system with an operation, a data model, or an element of production data of the second system.

In some cases, the monitoring entity may determine how to perform the second revision or set of revisions by referring to instructions described by one or more synchronization rules, wherein each rule describes how to respond to a particular type of revision. In this document, we may refer to an act of performing a set of instructions described by a synchronization rule as an act of "firing" the rule.

A synchronization rule may, for example, instruct the monitoring entity to respond to an update of a data model of a first system by performing an analogous update to a data model of a second system. Another rule may instruct the monitoring entity to respond to a user's entry of data into a database of the first system by updating an analogous database of the second system.

In some cases, a simple "mapping" rule may perform a mapping function that identifies which data elements of the second system correspond to analogous elements of the first system. But in other cases, a more complex "transform" rule may describe a multi-instruction logical procedure, algorithm, or data transformation necessary to perform more nuanced synchronization tasks.

Every time a system component or an element of stored data is added, removed, updated, or otherwise modified, the mechanism must be able to quickly identify the rules needed to respond to the modification. In many cases, the synchronization must be able to operate bidirectionally, in order to both respond to a revision to a first system by resynchronizing the second system; and to respond to a revision to the second system by resynchronizing the first system. In other cases, the synchronization mechanism may need to augment a synchronization procedure by identifying and retrieving additional, unmodified, data items from one of the systems or from external third-party repositories.

In real-world implementations, where such a synchronization mechanism system may comprise very large numbers of rules, the tasks of identifying and performing synchronization procedures may thus be prohibitively resource-intensive and prone to error.

BRIEF SUMMARY

A first embodiment of the present invention provides a method for efficiently synchronizing a source system and a target system, wherein the source system manages a source repository of production data that comprises a first source data element, the target system manages a target repository of production data that comprises a target data element, and wherein the synchronizing comprises a processor of a computer system resolving an inconsistency between the first source data element and the target data element by performing a procedure described by a first rule of a set of synchronization rules, the method comprising:

the processor receiving a first message that identifies a revision to the source repository, wherein the revision to the source repository causes the inconsistency;

the processor determining that the revision comprises a revision to the first source data element, wherein the determining is a function of information comprised by the first message;

the processor querying a source-to-rule cross-reference in order to identify one or more synchronization rules of the set of synchronization rules that are associated with the first source data element;

the processor obtaining an identification of the first rule in response to the querying;

the processor associating the first rule with the first source data element;

the processor formatting instructions into a form capable of directing a synchronization mechanism how to resolve the inconsistency by updating the target repository, wherein the formatted instructions are a function of information comprised by the first message and by the first rule; and the processor communicating the formatted instructions to the synchronization mechanism.

A second embodiment of the present invention provides a computer program product, comprising a computer-readable hardware storage device having a computer-readable program code stored therein, said program code configured to be executed by a processor of a computer system to implement a method for efficiently synchronizing a source system and a target system, wherein the source system manages a source repository of production data that comprises a first source data element, the target system manages a target repository of production data that comprises a target data element, and wherein the synchronizing the processor resolving an inconsistency between the first source data element and the target data element by performing a procedure described by a first rule of a set of synchronization rules, the method comprising:

the processor receiving a first message that identifies a revision to the source repository, wherein the revision to the source repository causes the inconsistency;

the processor determining that the revision comprises a revision to the first source data element, wherein the determining is a function of information comprised by the first message;

the processor querying a source-to-rule cross-reference in order to identify one or more synchronization rules of the set of synchronization rules that are associated with the first source data element;

the processor obtaining an identification of the first rule in response to the querying;

the processor associating the first rule with the first source data element;

the processor formatting instructions into a form capable of directing a synchronization mechanism how to resolve the inconsistency by updating the target repository, wherein the formatted instructions are a function of information comprised by the first message and by the first rule; and the processor communicating the formatted instructions to the synchronization mechanism.

A third embodiment of the present invention provides a computer system comprising a processor, a memory coupled to said processor, and a computer-readable hardware storage device coupled to said processor, said storage device containing program code configured to be run by said processor via the memory to implement a method for efficiently synchronizing a source system and a target system, wherein the source system manages a source repository of production data that comprises a first source data element, the target system manages a target repository of production data that comprises a target data element, and wherein the synchronizing the processor resolving an inconsistency between the first source data element and the target data element by performing a procedure described by a first rule of a set of synchronization rules, the method comprising:

the processor receiving a first message that identifies a revision to the source repository, wherein the revision to the source repository causes the inconsistency;

the processor determining that the revision comprises a revision to the first source data element, wherein the determining is a function of information comprised by the first message;

the processor querying a source-to-rule cross-reference in order to identify one or more synchronization rules of the set of synchronization rules that are associated with the first source data element;

the processor obtaining an identification of the first rule in response to the querying;

the processor associating the first rule with the first source data element;

the processor formatting instructions into a form capable of directing a synchronization mechanism how to resolve the inconsistency by updating the target repository, wherein the formatted instructions are a function of information comprised by the first message and by the first rule; and the processor communicating the formatted instructions to the synchronization mechanism.

DETAILED DESCRIPTION

Figure 1:
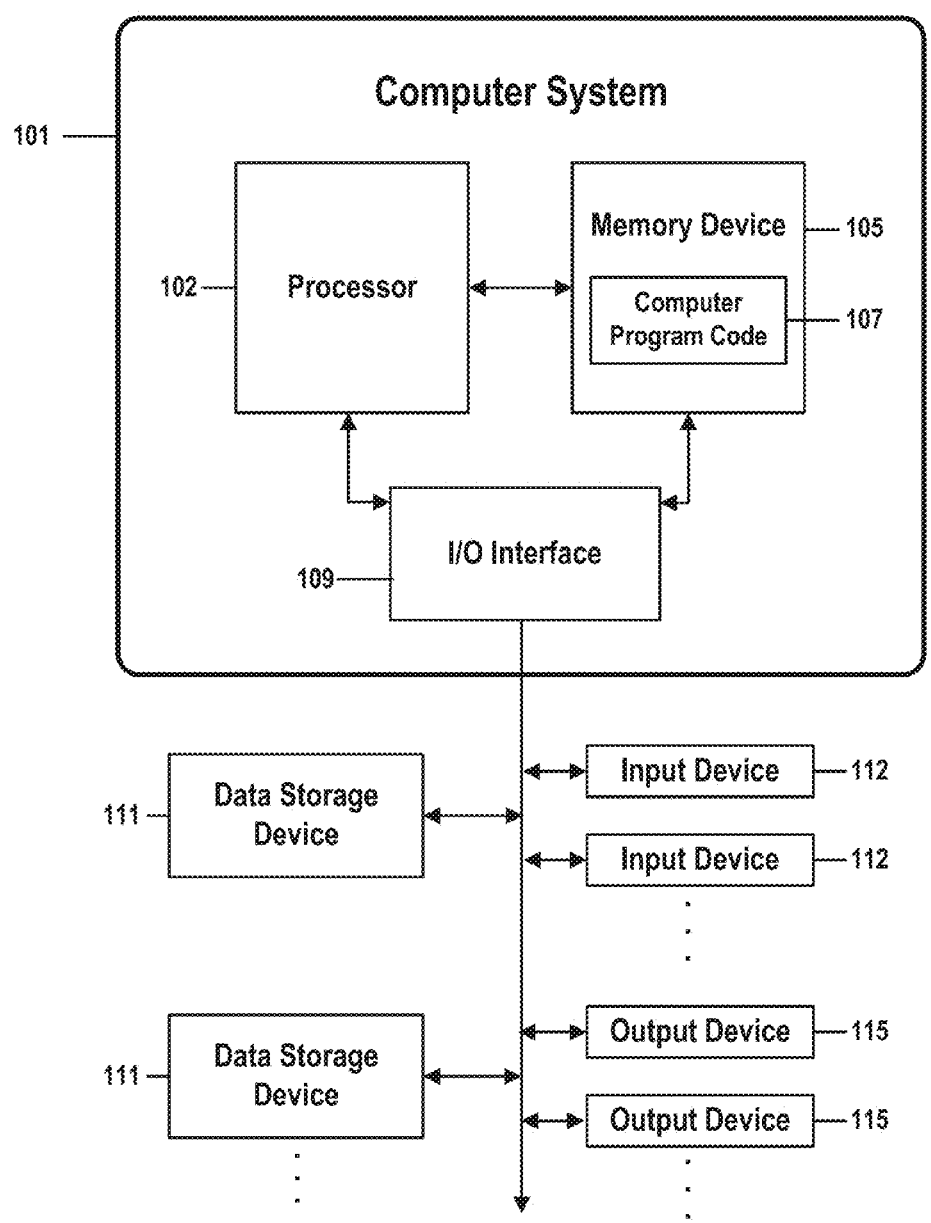
FIG. 1 shows the structure of a computer system and computer program code that may be used to implement a method for efficiently firing mapping and transform rules during bidirectional synchronization with embodiments of the present invention.

Embodiments of the present invention increase the efficiency of a synchronization mechanism that automatically resolves inconsistencies that arise between two or more systems by performing synchronization procedures defined by one or more rules a set of synchronization rules. Because such mechanisms may need to frequently identify and perform the procedure defined by a correct rule or rules from what may be an enormous set of rules, embodiments of the present invention increase efficiency of such a mechanism by providing a means for identifying rules quickly and for reducing redundant tasks when performing a procedure comprised by an identified rule Each system may comprise a combination of software applications, computer systems, and other types of electronic systems. An inconsistency between two systems may comprise an inconsistency between the ways that the two systems operate or perform a certain function, between the contents of repositories of production data maintained by the two systems, or between two or more data models that represent the organization of data managed by the two systems.

Although this disclosure generally describes methods of synchronizing two systems, the present invention is not limited to two-system embodiments. Methods of the present invention may be extended to a synchronization of any number of systems, and may synchronize a larger group of systems or subsets of a larger group of systems by organizing those systems into a plurality of pairs, into a plurality of groups that each comprise more than two systems, or in other ways.

Some embodiments of the present system may use analogous methods to synchronize messages communicated between two entities, where the synchronizing resolves inconsistencies between the format or organization of data comprised by the messages, data comprised by the messages, or data stored by the entities in response to receiving a particular message.

In such cases, methods used by embodiments described herein to synchronize databases described by two different data models may be applied instead to synchronize systems that communicate by means of two different message models, where a message model describes a format and organization in which a message represents information.

One such message-model embodiment might, for example, synchronize messages sent from and understood by a first entity in a first message format based on a first message model, with messages sent from and understood by a second entity in a second message format based on a second message model. Such a first entity might, for example, comprise a first communications system that sends and receives network traffic as a set of packets that conform to the TCP/IP (Transmission Control Protocol/Internet Protocol) standard; and a second such entity might comprise a second communications system that sends and receives network traffic as a set of packetized messages that conform to the OSI (Open Systems Interconnect) protocol stack. In this example, an embodiment of the present invention might, using methods analogous to those described herein, analyze a message model that represents an organization of the TCP/IP packets and then further analyze a message model that represents an organization of the OSI packetized messages and, in response, select synchronization rules, access cross-references, and perform other functions analogous to those described herein, in order to allow the first communications system and the second communications system to exchange data and process the exchanged data in consistent ways, despite inconsistencies among the respective message models.

Embodiments of the present invention increase efficiency of a synchronization mechanism that synchronizes two or more systems by means of an intermediary entity. This intermediary entity monitors the operations of the two systems and generates event messages that describe a revision to a first component of a first, or "source" system, where the revision may place the first system out of synchronization with a second, or "target" system. In some embodiments, this intermediary entity may comprise a component or components of the source system, of the target system, or of both systems, or may itself be a component of the source system, of the target system, or of both systems.

In one example of how such an intermediary entity might operate, if a user changes her account number in an account-tracking module of a source system, that number-changing event may result in a transmission to a target system or to the intermediary of a message documenting the event. This event message may be generated by the source system or by the target system by means known to those skilled in the art, may be generated by a component of the intermediary entity, or may be generated by a monitoring or synchronization entity distinct from the source system, the target system, and the intermediary. In all cases, the intermediary is the direct or indirect ultimate recipient of the event message.

In this example, the event message may provide information that permits the intermediary to take steps to ensure that an account-tracking function of the target system is appropriately updated in response to the user's account-number change. The target-system module, or the account-number information that the module tracks, would thus be modified in the target system as though the user had changed her account number in the target system. In some cases, synchronizing the source and target system might comprise a more complex function than merely copying the changed account number to the target system. When, for example, data models of the source and target systems differ significantly, the target system may store a unique set of data elements that are selected as a function of an account number, but may not store the account number itself. But even in such complex cases, one or more synchronization rules will describe procedures for keeping the source and target systems in sync.

In another example, consider a source system and a target system that maintain a customer list. If a new customer named "John Smith" is added to the source system's customer list, the source system, or a third-party intermediary system, might then generate and communicate a message to the target system instructing the target system to add customer "John Smith" to the target system's analogous customer list.

A synchronization mechanism that keeps a pair of systems synchronized in this way may be deemed "bidirectional" if it can send messages in either direction, in response to revisions to either system.

For example, a bidirectional synchronization mechanism that synchronizes a legacy software application with a newer, beta-version software application may deem either the legacy application or the beta application to be a "source" system that has been revised by an event that triggers the sending of a message. Here, if the legacy system is the source, the beta system would then be designated a "target" system that must be updated in order to remain synchronized with the legacy source. These designations, however, would be reversed if a later, second event modifies the beta (the previous "target"), resulting in a need to revise the previous "source" legacy system in order to keep the two systems synchronized. In other words, a system revised by an event is deemed a "source" and a system that must be revised by the synchronization mechanism in response to the event is deemed a "target." A bidirectional synchronization mechanism may synchronize either of two systems in response to an event that revises the other system.

As described above, when an event message identifies an event that may require performing a procedure in order to synchronize a target system to the revised source system, the details of this procedure may be described by one or more stored synchronization rules. Rules may perform many types of procedures that, in some embodiments, may be generally classified as either mapping or transform functions.

If, for example, a customer name stored by a source system is revised such that it is no longer identical to an equivalent name stored by a target system, synchronization may require simply copying the revised customer name in the source system to a database maintained by the target system. Such a procedure might be described by a mapping synchronization rule that associates (or "maps") a "CustomerName" field in a source database with an equivalent "CustName" field in the target database. Invoking (or "firing") this rule might then comprise performing the procedure of the rule as a function of a description of the source-system revision comprised by the event message. This firing would thus comprise copying the revised customer name, which the event message noted had been stored as an instance of the "CustomerName" field, to the target database as an instance of the "CustName" field.

In other cases, synchronization may a more complex "transformation" procedure. If, for example, a "CustomerName" field in a source database is associated with a pair of "FirstName" and "LastName" fields in one or more target databases, a corresponding transform synchronization rules may describe a logical procedure for dividing a "CustomerName" string into "FirstName" and "LastName" substrings.

In some cases, a rule may require data stored in a source system to be translated into a different data format, or into a different data structure in order to be exported to a target system.

Some synchronization procedures may comprise steps that retrieve additional unchanged data elements from the source system, that retrieve extrinsic data elements from one or more external sources distinct from both the source and the target systems, or that perform a task as a function of a condition, wherein that condition may be identified by a combination of source, target, and extrinsic data elements. Many types of synchronization procedures are possible, some of which are complex enough to require a synchronization rule to comprise one or more scripts, listings of pseudocode instructions, or computer progras.

Consider, for example, an embodiment in which a source system stores a customer name in two fields, "LastName" and "FirstName," but a target system stores the same customer name as a single field "CustomerName." Here, if a user changes the spelling of his first name in the source system, a synchronization mechanism might respond to an event message documenting this change by performing the following steps:

i) identify and retrieve from the source system the unchanged "LastName" value that corresponds to the changed "FirstName" value identified by the event message;

ii) concatenate the changed "FirstName" value to the retrieved "LastName" value; and iii) store the concatenated value as a revised instance of the "CustomerName" field in the target system.

Here, the event message identifies the "FirstName" logical data element of the source system and the changed-spelling instance of "FirstName" entered by the user. The synchronization rule, among other things, relates a change to an instance of "FirstName" in the source system to revisions to an instance of "LastName" in the source system and to an instance of "CustomerName" in the target system. The rule also comprises a procedure that describes how to revise "CustomerName" in the target system in response to a change to "FirstName" in the source system.

Such a rule may be characterized as an "augmented" rule because it requires "augmenting" the changed "FirstName" value with a second, independently retrieved, unchanged "LastName" value. In general, an augmented synchronization rule describes a procedure that requires more than one input data element, where this more than one input data element may comprise one or more elements retrieved from the source system and from external information repositories distinct from either the source system or the target system. Such an external repository of information may comprise, but is not limited to, a Web page, a log file, a result of a computation, query, or lookup, or other content-bearing local or remote storage media.

Event messages and synchronization rules may be created, implemented, and maintained by a variety of manual and automated means known to those skilled in the art. As described above, one or more components of one or more intermediary software applications, components of software applications, computer systems, or other entities may, for example, monitor source and target systems, generate an event message in response to detecting a revision event to either system's stored production data or data models, or identify and perform a synchronization function or procedure in response to the event or in response to a receipt of the message.

Such mechanisms may comprise a combination of automated and manual tasks. For example, a synchronization function or procedure may be performed automatically by a synchronization rule that was manually drafted by a system designer as a function of a manual analysis of data models associated with the source and target systems. In other cases, a synchronization function or procedure may be triggered manually in response to an automatically generated event message.

Revisions to a data model of a source or a target system may comprise restructuring or reorganizing data elements of a data model of either system or may comprise an addition of or a revision to a condition upon how a data element of a source data model is mapped or transformed into a format or structure that is compatible with a target data model.

Because both source and target data models may undergo such updating on a continuous or ongoing basis, mapping and transformation rules may themselves need to be continuously or repeatedly revised in response to system revisions. These revisions may be performed manually, but such manual procedures may be prohibitively cumbersome and resource-intensive if a system undergoes frequent revisions, comprises a large number of data models, data elements, program modules, or other components, or comprises coupled or related components such that a revision to a single component may affect other components.

Embodiments of the present invention increase the efficiency of such synchronization mechanisms by means of a set of data structures that store and automatically cross-reference information about data models of a source system, data models of a target system, extrinsic data elements that may be retrieved from an external information source, and a set of synchronization rules.

In particular, these data structures may comprise: a set of descriptions of logical procedures performed by rules of the set of synchronization rules; a cross-reference that relates one or more logical data elements of a source data model to one or more stored rules; a cross-reference that relates one or more logical data elements of a target data model to one or more stored rules; and a cross-reference that relates one or more extrinsic elements of data contained in neither the source nor the target systems to one or more stored rules.

In embodiments of the present invention, these data structures may be stored in any storage format or on any storage medium known to those skilled in the art of computer science and may be stored as any type of structured or unstructured data structure known to those skilled in the art of computer science. In an embodiment, such a tabular representation may be stored on a computer-storage device as one or more worksheets of a spreadsheet application.

These data models may comprise any representation of a data format used by the source or the target software application or system. These data formats may comprise, but are not limited to, tabbed, grouped, or independent spreadsheet program worksheets, combinations of flat files, relational databases, inverted databases, other type of databases, data dictionaries of one or more databases, knowledgebases, ontologies and schemas, triple stores, directed graphs, enumerations, comma-delimited lists, or other types of lists, and other data structures or information repositories known to those skilled in the relevant arts.

In some embodiments, a relation between a data structure associated with a rule and a data structure related to a data model of a source system may allow a rule to be automatically updated when there is a change to the source system. Similarly, in some embodiments, a relation between a data structure associated with a rule and a data structure related to a data model of a target system may allow a rule to be automatically updated when there is a change to the target system. In both cases, if a source system data model or a target system data model is a source of truth before the source data model or the target data model is changed, that model remains the source of truth after the rule is automatically updated in response to the change. The worksheets created by the present invention may be considered a source of truth for the synchronization rules that keep the source and target production data synchronized, but they do not cast themselves as a redundant source of truth for any source or target data model.

Embodiments of the present invention may make managing mapping and transformation rules more efficient and reliable by reducing a need for redundant rule management.

Because an embodiment of the present invention may automatically link or cross-reference a first logical data element of a source data model to all rules or other data elements associated with that logical data element, a compliant synchronization mechanism may address a revision to the source data model that comprises a change to the first logical data element by revising a single record of a data structure that describes attributes of the logical data element.

This single revision will then automatically propagate through all other data structures maintained by the synchronization mechanism that are linked or cross-referenced to the revised record or to the first logical data element. This automatic propagation may be accomplished by means of the set of linked data structures that uniquely describe procedures performed by synchronization rules and uniquely associate those rules with linked descriptions of source, target, and extrinsic data elements.

Embodiments of the present invention thus reduce or eliminate the resource-intensive, redundant, and error-prone task of responding to every revision to a source-system data model by manually identifying and updating every reference to a rule and every reference made by a rule to an other data element. Furthermore, as describe above and below, embodiments may produce similar benefits in response to a revision to an element of production data created, stored, or maintained by a source system.

Consider, for example, a set of transformation rules that comprises five rules that each transform a first data element of a source system in a different way. One rule might, for example, duplicate a transaction record entered into the source system as a record in a target-system PrintBuffer table if a print flag is set; a second rule might store certain fields of the transaction record in a Receivables table if the record's "credit" attribute is set; and the third, fourth, and fifth records might perform other operations that depend upon the state of other conditions or variables.

In a manual synchronization system, a change in the format of the way these transaction records are stored in the source system—such as increasing the length of a customer account number from 5 digits to 8 digits—might require an administrator to manually identify and modify all five rules that depend upon the transaction record's account-number field, and to then further identify any other rules that might be indirectly affected by the modification.

Embodiments of the present invention, however, would simplify or automate most of these tasks, requiring a representation of the transaction record to be changed only one time. This change would then, by means of the cross-reference, automatically propagate through all five rules that depend directly or indirectly upon the transaction record data element.

As described above, some embodiments may automatically identify a rule as being "augmented" if the rule comprises an output field that depends upon more than one input field. In some embodiments, when the augmented rule is updated or revised in response to an other change, such as an update or other revision to a source data model, a target data model, or an external information source, then the rule's identification as an augmented rule would alert the embodiment that all of the rule's input fields must be considered in the updating or revision.

Consider, for example, a rule that combines a "First-Name" source-system input field with a "LastName" source-system input field to create a "CustomerName" target-system database key, thus defining a relationship wherein the CustomerName data element of the target system depends upon two input fields stored ins the source system.

Embodiments of the current invention would know that, if the length of the LastName data element in a source data model is increased from 9 characters to 12 characters, then the CustomerName element of the target data model, and in all rules that depend directly or indirectly upon the CustomerName element, might correspondingly need to be increased.

Here, however, the embodiment, by means such as counting the number of input fields or otherwise relating a number of input fields of a rule to associated output fields, might automatically identify the rule as being "augmented." Thus, when the augmented rule is triggered in response to a revision of a FirstName value in a source-system production database, the embodiment would automatically know to proactively retrieve a corresponding LastName value.

In this complex example, the embodiment would have to account for the fact that only the LastName data element had been changed in the source system's data model, but only the FirstName value had changed in the source system's production-database. Using mechanisms described above, the embodiment would be able to correctly create the CustomerName key in the target system's production database, by determining that the length of the CustomerName element would have to be increased by three characters because the definition of the LastName element had been changed in the source data model.

Embodiments of the present invention may thus comprise an iterative process that continues to generate, relate, and revise mapping and transformation rules in response to a revision to a data element of the source system's data model, to a data element of the target system's data model, or to a characteristic of an extrinsic data element of an external information source that is associated with a synchronization rule.

In summary, embodiments of the present invention increase the efficiency and reliability of a synchronization mechanism that responds to a notification of a revision to a data model of a source system, or that responds to a notification of a revision to an element of production data of a source system, by performing a synchronization procedure described by a stored synchronization rule. Performing this synchronization procedure synchronizes the source to a target system by revising the target system in order to resolve any inconsistency caused by the revision to the source system.

The present invention increases the efficiency of such a synchronization mechanism by using cross-references to efficiently select an appropriate synchronization rule or rules from a larger set of rules, where the selected rule or rules describes how to synchronize the target system in response to a specific type of revision to the source system.

The present invention further increases the efficiency of the synchronization mechanism by means of linked worksheet data structures that work in cooperation with the cross-references to allow a synchronization mechanism to efficiently identify any additional required unchanged source data elements and to further identify any additional required extrinsic elements of information stored by neither the source nor the target system, that must be accessed, processed, analyzed, or retrieved in order to perform the procedure of the selected rule or rules.

FIG. 1 shows the structure of a computer system and computer program code that may be used to implement a method for efficiently firing mapping and transform rules during bidirectional synchronization in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code, said program code implementing methods of the present invention, do not comprise a signal generally, or a transitory signal in particular.

Any combination of one or more computer-readable medium(s) or devices may be used. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection, a portable computer diskette, a hard disk, a random access memory (RAM), a read-only memory (ROM), an erasable programmable read-only memory (EPROM or flash memory), Radio Frequency Identification tag, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, a broadcast radio signal or digital data traveling through an Ethernet cable. Such a propagated signal may take any of a variety of forms, including, but not limited to, electro-magnetic signals, optical pulses, modulation of a carrier signal, or any combination thereof.

Program code embodied on a computer-readable medium may be transmitted using any appropriate medium, including but not limited to wireless communications media, optical fiber cable, electrically conductive cable, radio-frequency or infrared electromagnetic transmission, etc., or any suitable combination of the foregoing.

Computer program code for carrying out operations for aspects of the present invention may be written in any combination of one or more programming languages, including, but not limited to programming languages like Java, Smalltalk, and C++, and one or more scripting languages, including, but not limited to, scripting languages like JavaScript, Perl, and PHP. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), an intranet, an extranet, or an enterprise network that may comprise combinations of LANs, WANs, intranets, and extranets, or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIGS. 1-4 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

The flowchart illustrations and/or block diagrams FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, wherein the module, segment, or portion of code comprises one or more executable instructions for implementing one or more specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for efficiently firing mapping and transform rules during bidirectional synchronization in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for efficiently firing mapping and transform rules during bidirectional synchronization.

Any of the components of the present invention could be created, integrated, hosted, maintained, deployed, managed, serviced, supported, etc. by a service provider who offers to facilitate a method for efficiently firing mapping and transform rules during bidirectional synchronization. Thus the present invention discloses a process for deploying or integrating computing infrastructure, comprising integrating computer-readable code into the computer system 101, wherein the code in combination with the computer system 101 is capable of performing a method for efficiently firing mapping and transform rules during bidirectional synchronization.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for generating a service-catalog entry from discovered attributes of provisioned virtual machines may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for generating a service-catalog entry from discovered attributes of provisioned virtual machines is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
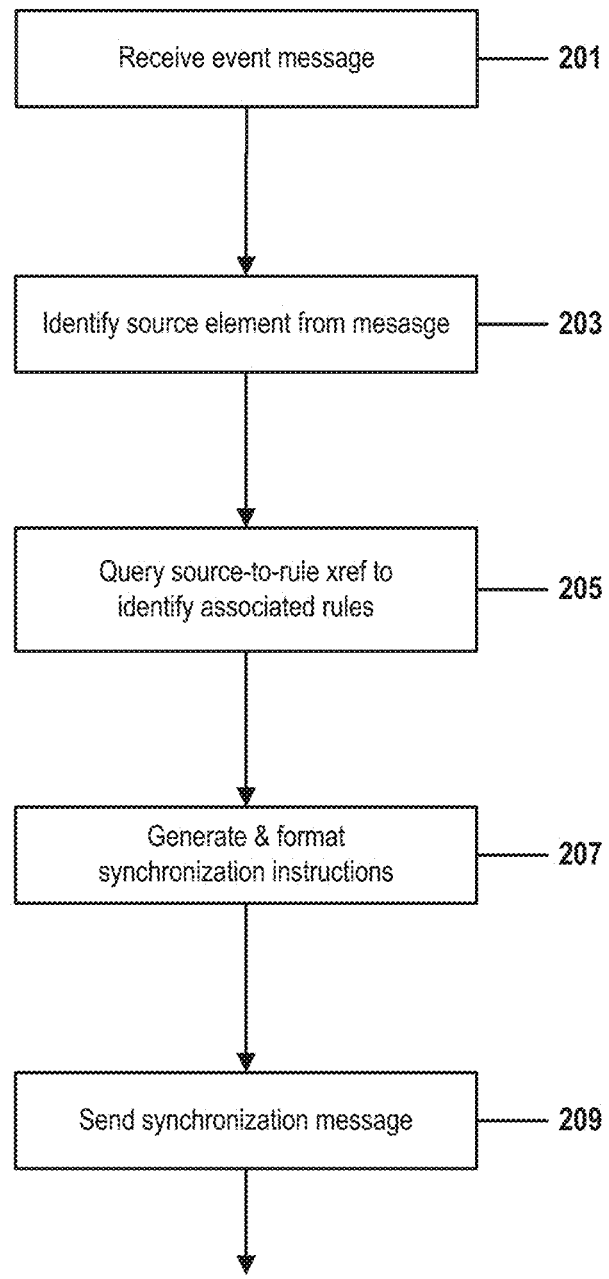
FIG. 2 is a flow chart that illustrates an embodiment of a method of efficiently firing mapping and transform rules during bidirectional synchronization in accordance with embodiments of the present invention.

FIG. 2 is a flow chart that illustrates an embodiment of a method of efficiently firing mapping and transform rules during bidirectional synchronization in accordance with embodiments of the present invention. FIG. 2 comprises steps 201-209.

In step 201, a processor, software application, or other entity associated with the synchronization mechanism (referred to here as simply "the processor") receives an event message generated in response to a revision to an element of production data created, stored, or otherwise maintained by a source system. A structure, storage format, logical connection or relation, or other characteristic of this element of data may be described by or otherwise associated with a logical data element of a data model of the source system.

As described above, a data model may take any form known to those skilled in the art of data modeling, information technology, or related fields, where such a form may comprise, but is not limited to, a combination of one or more databases, flat files, knowledgebases, schemas, subschemas, ontologies, scripts, source code listings, pseudocode, or unstructured information repositories.

An event message may be generated by the source system or by the target system by means known to those skilled in the art, may be generated by a component of an intermediary entity, or may be generated by a distinct monitoring or synchronization entity. The message may comprise identifications of or representations of: an addition, deletion, modification, entry, combination, assignment or modification of condition, or other revision to the element of data; and of one or more logical data elements of a source data model, where the one or more logical elements identify, characterize, or are otherwise associated with the revised element; and any other information that may be useful in documenting the revision or an effect of the revision, or in identifying entities associated with, dependent upon, or otherwise affected by the revision.

The forms and content of the received message and of the source data model must make it possible for the embodiment to infer an input field, if one exists, of a synchronization rule of a set of stored synchronization rules.

In step 203, the processor analyzes, parses, or otherwise examines the message received in step 201 in order to identify the revision to the element of production data and the source-model logical data element associated with the revised element of production data.

This identifying may be done by any means known to those skilled in the art, and may incorporate elements of parsing methods used by compilers or user interfaces, methods of text or semantic analytics, data-extraction methods associated with a structured message format, a database or knowledgebase query mechanism, or other means known to those skilled in the art.

At the conclusion of step 203, embodiments of the present invention will have identified a revision made to an element of production data of the source system as a function of the event and will have further identified a logical data element of a source-system data model, wherein the logical data element is identified by, characterized by, or otherwise associated with the revised production data.

In step 205, the processor queries a source-to-rule cross-reference in order to identify a synchronization rule or rules that describe one or more logical procedures that should be performed in response to the revision to an instance of the logical data element identified in step 203. The purpose of performing these one or more procedures is to revise the production data maintained by the target system, in order to resolve any inconsistencies between the production data of the source system and the production data of the target system that arose as a direct or indirect result of the revision identified in step 203.

The source-to-rule cross-reference, as described above, is a repository of information structured into records using means known to those skilled in the art. The cross-reference may, for example, be implemented as a flat file, as a relational database, or as a worksheet. In one embodiment, the cross-reference may be stored on a computer-storage device as one or more worksheets of a spreadsheet application.

Each record of the cross-reference associates a logical data element of a source data model with a synchronization rule of the set of synchronization rules and may further describe elements of information related to the logical data element or the synchronization rule and may further comprise links that allow the record to be related to a record of an other cross-reference or data structure maintained by the synchronization mechanism.

At the conclusion of step 205, embodiments of the present invention will have identified one or more synchronization rules that should be performed in response to the source-system revision identified in step 203.

In step 207, embodiments of the present invention prepare a synchronization message that may be directly or indirectly communicated to the target system in order to instruct the target system how to resolve inconsistencies between the production data of the target system and the revised production data of the source system, where the inconsistencies may have arisen as a consequence of the revision identified in step 203.

This message describes instructions that directly or indirectly implement one or more logical procedures associated with the rule or rules identified in step 205. In some embodiments, a link comprised by a record of the source-to-rule cross reference identified in step 205 may identify a rule-logic record of a rule-logic table or other data structure. This rule-logic record may be identified by a rule identifier, which identifies the synchronization rule associated with the source-to-rule record identified in step 205.

In other words, a procedure of step 207 allows the processor to identify a logical synchronization procedure associated with the rule identified in step 205 by using the rule's rule identifier, identified in step 205, to query the rule-logic table.

The processor then uses information retrieved in earlier steps, such as the nature of the user's revision to the source-system production data, to translate the rule's logical instructions into specific instructions to the target system, or to a component of a synchronization entity, that are formatted to be understood by the target system or component.

When more than one synchronization rule is identified by step 205, all or part of step 207 may be repeated for each rule. When two or more rules are identified by step 205, the source-to-rule mapping cross-reference may comprise a record for each rule-data element combination. If the logical data element identified in step 203 is, for example, associated with three rules, step 205 may identify three records in the source-to-rule cross-reference, each of which is associated with the logical data element, but each of which is identified by a distinct rule identifier. Each of these three rule identifiers may then be used to identify a distinct rule-logic record and each identified rule-logic record may identify one of three distinct logical procedures that should be performed in response to the revision identified in step 203.

In such a case, the procedure of step 207 may create and format a synchronization message that is a function of all three logical procedures. When an other number of multiple rules is identified in step 205, analogous variations of the procedures of step 205 and 207 are performed in order to ensure the performance of logical procedures of all identified rules, as required to fully synchronize the source and target production data in response to the revision identified in step 203.

In step 209, the processor, using means known to those skilled in the art, communicates the synchronization message formatted in step 207 to the target system or to a component of a synchronization entity. The recipient will then directly or indirectly perform steps described by or inferred from the communicated synchronization message. Upon completion of these steps, and of any other procedures that are performed in response to the performance of these steps, the production data of the target system will have been revised so as to resolve any inconsistencies between the production data of the source system and that production data of the target system, where those inconsistencies arose as a function of the revision to the source system identified in step 203.

In one example of the method of FIG. 2, consider a user revision to a source system that comprises editing the user's street address, which the source system stores as an element of production data in its source database as an instance of logical data element "Street" identified by a data model that represents an organization of the source system's stored data.

A component of a synchronization mechanism that monitors the operation of the source system might capture a description of this revision from the source database's transaction-logging module and use that captured information to generate an event message that describes the revision and that identifies the "Street" logical data element in the source-system's data model. This description might comprise characteristics of the revision such as a original, pre-revision, value of the revised element of data, the revised value of the element, characteristics or identifiers of a user that performed the revision, characteristics or identifiers of a system, user, account, or other entity associated with the revised data element, an identifier of a parent data structure or an instance of a parent data structure that comprises the revised data element.

Here, the procedure of step 201 would comprise the receipt of this event message by a processor or other component of an embodiment of the present invention. In step 203, the processor would identify the user's revised street address and the "Street" logical data element by parsing the received message.

In step 205, the processor queries a source-to-rule cross-reference worksheet in order to identify all synchronization rules that describe logical procedures that should be performed whenever an instance of the "Street" element is revised. In this example, this query returns one record of the source-to-rule cross-reference that identifies rule R001. This record further identifies characteristics of rule R001 that show that rule R001 does not require any other input fields and modifies only an instance of the "Address" logical data element of the target system, where the instance of "Address" is comprised by an element of production data of the target system that is associated with other target-system data that is in turn associated with the user, and the "Address" logical data element is comprised by a data model that represents an organization or format of the production data of the target system.

In step 207, the processor uses rule identifier R001 to query a rule-logic worksheet in order to select rule-logic records that each identify a distinct logical procedure associated with rule R001. Here, the query returns a single record that describes a simple mapping procedure. This procedure indicates that the target system may be synchronized with the source system after a revision is made to an instance of the source system's "Street" logical data element by copying a value of the revised instance to a complementary instance of the target system's "Address" logical data element.

The processor thus responds to the indication of this procedure by formatting a set of instructions that instruct the target system (or an intermediary component that would in turn directly or indirectly instruct the target system) to replace an existing instance of the "Address" element in the target database with a copy of the revised data stored as an instance of a corresponding "Street" element of the source database.

When implementing procedures like these, methods known to those skilled in the art may be used to determine which instance of a target-system logical element corresponds to a revised instance of a source-system logical element. Such methods may include referring to system logs or transaction records. In some embodiments, an event message received in step 201 may contain additional identifying information that allows the processor to identify a specific record, field, other data structure, or other element of source-system production data in the target system. In this example, the event message might include a user account number or a full user name, and this information might then be used in step 207 to refine an instruction that allows the recipient of the formatted instructions to precisely identify a distinct element of data in the target system that should be updated.

This example concludes with step 209, wherein the instructions generated and formatted in step 207 are communicated to the target system or to an other component of a synchronization mechanism as a synchronization message. When performed, these instructions will copy the source system's revised street address data into a corresponding area of the target system's production data.

Figure 3:
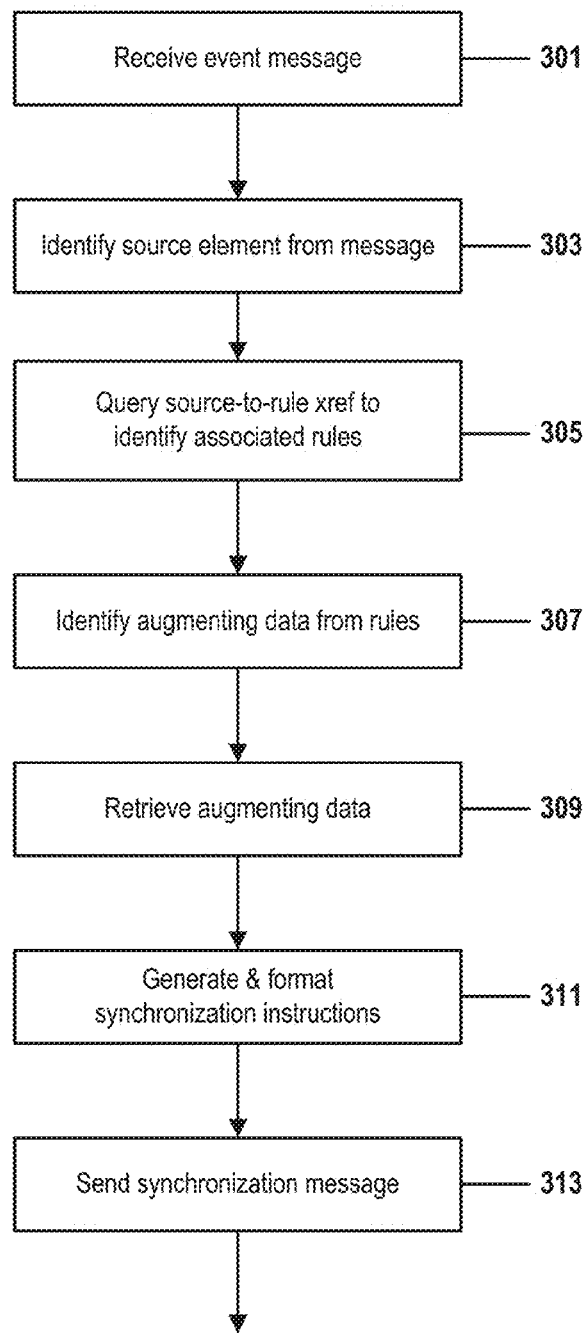
FIG. 3 is a flow chart that illustrates an embodiment of a method of efficiently firing mapping and transform rules during bidirectional synchronization in accordance with embodiments of the present invention, wherein the synchronization requires accessing additional data elements extrinsic data from the source system or from an external source.

When complementing other components of a bidirectional synchronization mechanism like those described herein, embodiments of FIG. 2 and FIG. 3 may be used to resolve an inconsistency between source-system and target-system production data regardless of whether the inconsistency is caused by a revision to the source system or by a revision to the target system. Although working in the reverse direction may result in reversing or inverting the "source" and "target" characterizations of two systems being synchronized, the procedural steps are otherwise unchanged.

In one example, wherein a synchronization mechanism responds to an "inverse-direction" event message that identifies a revision to an element of production data of a target system (rather than a source system), an embodiment of FIG. 2 may be deemed to comprise the following steps:

the processor receives an inverse-direction message that identifies an "inverse-direction revision" to the target system's production data. Here, the inverse-direction revision causes an "inverse-direction inconsistency" between the source system's production data and the target system's production data in response to the revision to the target system data;

the processor determines that the inverse-direction revision comprises a revision to a data element of the target system's production data, wherein the determining is a function of information comprised by the inverse-direction message;

the processor queries a source-to-rule cross-reference in order to identify one or more "inverse-direction synchronization rules" that are associated with the revised element of target production data;

the processor receives an identification of an inverse-direction rule in response to the querying;

the processor associates the inverse-direction rule with the revised element of target production data;

the processor formats a set of "inverse-direction instructions" into a form capable of directing the bidirectional synchronization mechanism to resolve the inverse-direction inconsistency by updating the source system's production data, wherein the formatted inverse-direction instructions are a function of, or depend upon, information comprised by the inverse-direction message and by the inverse-direction rule; and the processor communicates the formatted inverse-direction instructions as a synchronization message to the synchronization mechanism, which performs resolves the inverse-direction inconsistency by performing a logical procedure described by the inverse-direction instructions.

If an inverse-direction synchronization comprise an inverse-direction rule that is an augmented rule, the synchronization procedure incorporates additional augmenting data-retrieval steps analogous to those of the method of FIG. 3.

For purposes of this document, in order to minimize use of cumbersome "inverse-direction" nomenclature, any synchronization method comprised by an embodiment of the present invention should be deemed capable of being performed in either direction, to synchronize a source system to a revised target system as well as to synchronize a target system to revised source system.

FIG. 3 is a flow chart that illustrates an embodiment of a method of efficiently firing mapping and transform rules during bidirectional synchronization in accordance with embodiments of the present invention, wherein the synchronization requires accessing additional data elements extrinsic data from the source system or from an external source. FIG. 3 comprises steps 301-313.

In step 301, as in step 201 of FIG. 2, a processor, software application, or other entity associated with the synchronization mechanism (referred to here as simply "the processor") receives an event message generated in response to a revision to an element of production data created, stored, or otherwise maintained by a source system, where the revised element is an instance of a logical data element of a data model, and where the data model identifies an organization or other characteristic of data maintained by the source system.

In step 303, as in step 203 of FIG. 2, the processor analyzes, parses, or otherwise examines the message received in step 301 in order to identify the revision to the element of production data and to further identify the source-model logical data element associated with the revised element of production data.

In step 305, as in step 205 of FIG. 2, the processor queries a source-to-rule cross-reference in order to identify a synchronization rule or rules that describe one or more procedures that should be performed in response to the revision to the instance of the logical data element identified in step 303.

As noted in the description of steps of FIG. 2, each record of the source-to-rule cross-reference associates a logical data element of a source data model with a synchronization rule of the set of synchronization rules, and each record may further identify other characteristics of, or other elements of information related to, the logical data element and the synchronization rule and may further comprise links that allow the record to be related to records in other cross-references or other data structures maintained by the synchronization mechanism.

In step 307, embodiments of the present invention determine whether a synchronization rule identified by a record of the source-to-rule cross-reference is an "augmented" synchronization rule, where an augmented rule is associated with a logical procedure that requires "augmenting" elements of data in addition to the revised source element identified in step 303. In this document, we will describe an augmented rule as being associated with a logical procedure that "augments" a single revised source element with one or more additional input elements.

As described above, these augmenting data elements may comprise a combination of elements of the source system's production data and "extrinsic" data elements that are stored at external information repositories distinct from both the source and the target systems.

In some embodiments, augmented rules may be quickly identified by means of one or more "count" fields comprised by each record of the source-to-rule cross-reference. In some embodiments, these count fields may be linked to corresponding count fields in records of other data structures and cross-references maintained by the synchronization mechanism such that, should a value of a count field be altered in one data structure or cross-reference, that alteration will propagate automatically throughout the synchronization mechanism. In some embodiments, if a number of input data elements associated with a rule changes, the processor will automatically change the corresponding count fields of records associated with the rule.

An instance of a count field in a record that identifies a synchronization rule may identify how many input fields are associated with the rule or with a logical procedure associated with the rule. In some embodiments, a record may comprise multiple count fields that respectively identify a total number of elements of source-system data associated with a rule, a total number of unchanged elements of source-system data associated with a rule (that is, the number of source elements other than the one identified in step 303), a number of extrinsic data elements associated with the rule, or some other function of these values.

In such embodiments, an augmented rule may be identified quickly by merely querying a count field of one or more records of the source-to-rule mapping worksheet that are associated with the one or more rules identified in step 305. Even if an other, unrelated, error causes a record to identify multiple, redundant data elements that are not distinct, these count fields allow a synchronization mechanism to quickly and reliably determine that an identified rule is an augmented rule.

In step 309, once the procedure of step 307 has determined that a rule identified in step 305 is an augmented rule, the processor retrieves augmenting data identified by the record of the source-to-mapping cross-reference that corresponds to the augmented rule. If the procedure of step 305 identifies more than one augmented rule, this step is repeated for each rule.

In some embodiments, the source-to-rule lookup of step 307 merely identifies that a rule depends upon at least one element of augmenting data, but identifies neither the actual augmenting elements, nor the locations of the augmenting elements. If such an augmenting element comprises an element of extrinsic data, some embodiments may store this identifying information for the extrinsic element in an extrinsic-data-to-rule cross-reference that associates a synchronization rule with one or more elements of extrinsic data.

In some cases, this extrinsic-data-to-rule cross-reference may comprise one record for each unique synchronization rule. In other embodiments, it may comprise one record for each unique combination of rule and extrinsic data element. The latter class of embodiments might, for example, comprise three records for rule R0101 if rule R0101 describes a logical procedure that requires three elements of extrinsic data.

In embodiments that comprise such an extrinsic-data-to-rule cross-reference data structure, this data structure, like all the cross-references and other data structures comprised by embodiments described herein, may comprise any form known to those skilled in the art that facilitate a function of retrieving records of data with database-like queries or lookups. The retrieving may be performed by means of any combination of querying, browsing, or lookup procedures, techniques, or technologies known to those skilled in the art.

If, for example, an augmenting extrinsic data element comprises an updated statistic stored at a government Web site, the retrieving may be done by means of a set of HTML, Java, or PHP instructions that adhere to conventions generally used to download data from the Internet.

In another example, if a source system's production data is stored in a relational database, then retrieving an augmenting source data element from the production database may be done by means of an SQL (Structured Query Language) query, where the query is constructed as a function of a combination of information comprised by the event message received in step 301, by a source-to-mapping cross-reference record identified in step 305, or by an other record of data identified in an other data structure of the synchronization system, where the other record may be identified by means of a linked data element comprised by the identified source-to-mapping cross-reference record.

At the conclusion of step 309, the processor will have gathered all necessary input information necessary to perform the logical procedures of the synchronization rule or rules identified in step 305. This input information may comprise a value of or an other characteristic of the revised element of source data identified in step 303, a description of a logical procedure necessary to resolve inconsistencies between the source production data and the target production data that occurred as a result of the revision, the values of additional elements of data required by the procedure, where those values may have been retrieved from the source system's production data and from external sources, and the elements of the target system's production data that must be revised in order to perform the logical procedure, where those target elements may have been identified by records retrieved from the source-to-rule cross-reference, from the rule-logic cross-reference, or from an other cross-reference or data structure comprised by the synchronization mechanism.

Some embodiments may further comprise a target-to-rule cross-reference that may be analogous in form to the source-to-rule cross-reference, and may be used to identify logical data elements of the target system associated with a particular rule. In such embodiments, the processor may be able to quickly identify target data elements that are revised by a logical procedure of a synchronization rule by using the rule's rule identifier to query such a target-to-rule cross-reference.

Once all these components are in place, a procedure of step 311 uses them to prepare a synchronization message that may be directly or indirectly communicated to the target system in order to instruct the target system how to resolve inconsistencies between its production data and the revised production data of the source system that may have arisen as a consequence of the revision identified in step 303.

The synchronization message describes instructions that directly or indirectly implement one or more logical procedures associated with the rule or rules identified in step 305. In some embodiments, a link comprised by a record of the source-to-rule cross reference identified in step 305 may identify a record of a rule-logic table. This rule-logic record may be identified by an associated rule identifier that identifies the synchronization rule associated with the source-to-rule record identified in step 305.

The processor then uses information inferred, identified, retrieved, or otherwise gathered in steps 303-309, including augmenting data retrieved in step 309, to translate the rule's logical instructions into specific instructions to the target system, or to a component of a synchronization entity, that are formatted to be understood by the target system or component and to package these instructions into a synchronization message that takes a form that may be understood by a component of the target system, of the intermediary, or of an other recipient of the message.

In step 313, the processor, using means known to those skilled in the art, communicates the synchronization message generated in step 311 to the target system or to a component of a synchronization entity. The recipient will then take actions to perform steps described by the communicated synchronization message. Upon completion of these steps, and of any other procedures that are performed in response to the performance of these steps, the production data of the target system will have been revised so as to resolve any inconsistencies between the production data of the source system and the production data of the target system, where those inconsistencies arose as a function of the revision to the source system identified in step 303.

In an example of this procedure that complements the example that concludes the description of the method of FIG. 2, consider a case wherein a revision of a user's street address in a source system leads to an identification of an augmented synchronization rule R001A. This rule identifies two augmenting data elements: an unrevised "State" field of the source system and a Zip code database stored at a remote Web site.

As in the example of FIG. 2, the processor in step 303 here extracts an identification of logical data element "Street" from an event message that describes the address revision. In step 305, the processor uses this information to identify rule R001A in the source-to-mapping cross-reference. A count field of the record associated with rule R001A indicates that rule R001A depends upon three input fields, notifying the system that it must process an augmented rule that comprises two elements of augmenting data.

In step 309, the processor identifies the augmenting data by examining contents of the fields of the record of the source-to-mapping cross-reference. In some embodiments, the fields might provide all the information that the processor needs at this stage by identifying the "State" logical data element of the source system's data model and an Internet URL Internet address of the remote Zip code database. In other embodiments, depending on implementation details and goals of the system designers, the processor might, by means known to those skilled in the art, retrieve actual values of these elements by retrieving the value of the "State" field from the source production data and by further downloading all or part of the remote Zip code database.

Step 311 would then organize all these data elements into a synchronization message that describes a method that is a function of a logical procedure that corresponds to rule R001A, where that logical procedure may be associated with rule R001A by a record of the rule-logic table.

In this example, a logical procedure of rule R001A might comprise the following steps:

i) copy the revised street address stored in the source system database to a corresponding instance of the "Address" logical data element in the target system;

ii) retrieve a value of an instance of the "State" logical data element from the source database that corresponds to or is otherwise associated with the revised instance of the "Address" logical element;

iii) query the remote Zip code database to identify a Zip code value by submitting the revised street address and the value of the retrieved "State" data to the remote database located at the URL address;

iv) copy the Zip code value returned by the remote database to a corresponding "ZipCode" field in the target-system database.

In this example, the "ZipCode" logical data element may have been identified by the logical procedure of rule R001A; by information comprised by a source-to-rule cross-reference record identified in step 305; by information comprised by a rule-logic record identified in step 305; by other means known to those skilled in the arts of data management, database administration, or information technology; or by combinations thereof.

Finally, the synchronization message is communicated in step 313 to the target system or to an other component of a synchronization mechanism, which directly or indirectly performs the procedure described by the message in order to synchronize the source and target systems.

What is claimed is:

1. A method for efficiently synchronizing a source system and a target system, wherein the source system manages a source repository of production data that comprises a first source data element, the target system manages a target repository of production data that comprises a target data element, and wherein the synchronizing comprises a processor of a computer system resolving an inconsistency between the first source data element and the target data element by performing a procedure described by a first rule of a set of synchronization rules, the method comprising:

the processor receiving a first message that identifies a revision to the source repository, wherein the revision to the source repository causes the inconsistency;

the processor determining that the revision comprises a revision to the first source data element, wherein the determining is a function of information comprised by the first message;

the processor querying a source-to-rule cross-reference in order to identify one or more synchronization rules of the set of synchronization rules that are associated with the first source data element;

the processor obtaining an identification of the first rule in response to the querying;

the processor associating the first rule with the first source data element;

the processor formatting instructions into a form capable of directing a synchronization mechanism how to resolve the inconsistency by updating the target repository, wherein the formatted instructions are a function of information comprised by the first message and by the first rule; and the processor communicating the formatted instructions to the synchronization mechanism.

2. The method of claim 1, the method further comprising:
the processor further obtaining an identification of a second source data element in response to the querying, wherein the second source data element is comprised by the source repository of production data;
the processor further associating the first rule with the second source data element; and
the processor retrieving the second source data element from the source repository.

3. The method of claim 1, the method further comprising:
the processor further querying an extrinsic-data-to-rule cross-reference in order to identify an extrinsic data element stored in an external repository, wherein the external repository that is distinct from both the source repository and the target repository;
the processor further obtaining an identification of the extrinsic data element in response to the further querying;
the processor further associating the first rule with the extrinsic data element; and
the processor retrieving the extrinsic data element from the external repository.

4. The method of claim 1, the method further comprising:
the processor further querying a rule-logic cross reference in order to identify a first logical procedure; and
the processor further obtaining an identification of the first logical procedure in response to the further querying; and
the processor further associating the first rule with the first logical procedure, wherein the formatted instructions are a further function of information comprised by the first logical procedure.

5. The method of claim 4, wherein the form capable of directing a synchronization mechanism is a target message format that may be understood by the target system, and wherein the communicating comprises communicating a synchronization message to the target system that instructs the target system to revise the target data element by performing one or more steps of the first logical procedure.

6. The method of claim 1, the method further comprising:
the processor further obtaining an identification of a second rule of the set of synchronization rules in response to the querying; and
the processor further associating the second rule with the first source data element and with a second logical procedure, wherein the synchronization message further performs one or more steps of the second logical procedure.

7. The method of claim 1, the method further comprising:
the processor receiving an inverse-direction message that identifies an inverse-direction revision to the target repository, wherein the inverse-direction revision causes an inverse-direction inconsistency between the source repository and the target repository;
the processor determining that the inverse-direction revision comprises a revision to a second target data element comprised by the target repository, wherein the determining is a function of information comprised by the inverse-direction message;
the processor querying the source-to-rule cross-reference in order to identify one or more inverse-direction synchronization rules of the set of synchronization rules that are associated with the second target data element;

the processor obtaining an identification of an inverse-direction rule in response to the querying;

the processor associating the inverse-direction rule with the second target data element;

the processor formatting inverse-direction instructions into a form capable of directing a synchronization mechanism how to resolve the inconsistency by updating the source repository, wherein the formatted inverse-direction instructions are a function of information comprised by the inverse-direction message and by the inverse-direction rule; and the processor communicating the formatted inverse-direction instructions to the synchronization mechanism.

8. The method of claim 1, further comprising providing at least one support service for at least one of creating, integrating, hosting, maintaining, and deploying computer-readable program code in the computer system, wherein the computer-readable program code in combination with the computer system is configured to implement the receiving, determining, querying, obtaining, associating, formatting, and communicating.

9. A computer program product, comprising a computer-readable hardware storage device having a computer-readable program code stored therein, said program code configured to be executed by a processor of a computer system to implement a method for efficiently synchronizing a source system and a target system, wherein the source system manages a source repository of production data that comprises a first source data element, the target system manages a target repository of production data that comprises a target data element, and wherein the synchronizing the processor resolving an inconsistency between the first source data element and the target data element by performing a procedure described by a first rule of a set of synchronization rules, the method comprising:

the processor receiving a first message that identifies a revision to the source repository, wherein the revision to the source repository causes the inconsistency;

the processor determining that the revision comprises a revision to the first source data element, wherein the determining is a function of information comprised by the first message;

the processor querying a source-to-rule cross-reference in order to identify one or more synchronization rules of the set of synchronization rules that are associated with the first source data element;

the processor obtaining an identification of the first rule in response to the querying;

the processor associating the first rule with the first source data element;

the processor formatting instructions into a form capable of directing a synchronization mechanism how to resolve the inconsistency by updating the target repository, wherein the formatted instructions are a function of information comprised by the first message and by the first rule; and the processor communicating the formatted instructions to the synchronization mechanism.

10. The computer program product of claim 9, the method further comprising:

the processor further obtaining an identification of a second source data element in response to the querying, wherein the second source data element is comprised by the source repository of production data;

the processor further associating the first rule with the second source data element; and the processor retrieving the second source data element from the source repository.

11. The computer program product of claim 9, the method further comprising:

the processor further querying an extrinsic-data-to-rule cross-reference in order to identify an extrinsic data element stored in an external repository, wherein the external repository that is distinct from both the source repository and the target repository;

the processor further obtaining an identification of the extrinsic data element in response to the further querying;

the processor further associating the first rule with the extrinsic data element; and the processor retrieving the extrinsic data element from the external repository.

12. The computer program product of claim 9, the method further comprising:

the processor further querying a rule-logic cross reference in order to identify a first logical procedure; and the processor further obtaining an identification of the first logical procedure in response to the further querying; and the processor further associating the first rule with the first logical procedure, wherein the formatted instructions are a further function of information comprised by the first logical procedure.

13. The computer program product of claim 12, wherein the form capable of directing a synchronization mechanism is a target message format that may be understood by the target system, and wherein the communicating comprises communicating a synchronization message to the target system that instructs the target system to revise the target data element by performing one or more steps of the first logical procedure.

14. The computer program product of claim 9, the method further comprising:

the processor further obtaining an identification of a second rule of the set of synchronization rules in response to the querying; and the processor further associating the second rule with the first source data element and with a second logical procedure, wherein the synchronization message further performs one or more steps of the second logical procedure.

15. The computer program product of claim 9, the method further comprising:

the processor receiving an inverse-direction message that identifies an inverse-direction revision to the target repository, wherein the inverse-direction revision causes an inverse-direction inconsistency between the source repository and the target repository;

the processor determining that the inverse-direction revision comprises a revision to a second target data element comprised by the target repository, wherein the determining is a function of information comprised by the inverse-direction message;

the processor querying the source-to-rule cross-reference in order to identify one or more inverse-direction synchronization rules of the set of synchronization rules that are associated with the second target data element;

the processor obtaining an identification of an inverse-direction rule in response to the querying;

the processor associating the inverse-direction rule with the second target data element;

the processor formatting inverse-direction instructions into a form capable of directing a synchronization mechanism how to resolve the inconsistency by updating the source repository, wherein the formatted inverse-direction instructions are a function of information comprised by the inverse-direction message and by the inverse-direction rule; and the processor communicating the formatted inverse-direction instructions to the synchronization mechanism.

16. A computer system comprising a processor, a memory coupled to said processor, and a computer-readable hardware storage device coupled to said processor, said storage device containing program code configured to be run by said processor via the memory to implement a method for efficiently synchronizing a source system and a target system, wherein the source system manages a source repository of production data that comprises a first source data element, the target system manages a target repository of production data that comprises a target data element, and wherein the synchronizing the processor resolving an inconsistency between the first source data element and the target data element by performing a procedure described by a first rule of a set of synchronization rules, the method comprising:

the processor receiving a first message that identifies a revision to the source repository, wherein the revision to the source repository causes the inconsistency;

the processor determining that the revision comprises a revision to the first source data element, wherein the determining is a function of information comprised by the first message;

the processor querying a source-to-rule cross-reference in order to identify one or more synchronization rules of the set of synchronization rules that are associated with the first source data element;

the processor obtaining an identification of the first rule in response to the querying;

the processor associating the first rule with the first source data element;

the processor formatting instructions into a form capable of directing a synchronization mechanism how to resolve the inconsistency by updating the target repository, wherein the formatted instructions are a function of information comprised by the first message and by the first rule; and the processor communicating the formatted instructions to the synchronization mechanism.

17. The system of claim 16, the method further comprising:

the processor further obtaining an identification of a second source data element in response to the querying, wherein the second source data element is comprised by the source repository of production data;

the processor further associating the first rule with the second source data element; and the processor retrieving the second source data element from the source repository.

18. The system of claim 16, the method further comprising:

the processor further querying an extrinsic-data-to-rule cross-reference in order to identify an extrinsic data element stored in an external repository, wherein the external repository that is distinct from both the source repository and the target repository;

the processor further obtaining an identification of the extrinsic data element in response to the further querying;

the processor further associating the first rule with the extrinsic data element; and the processor retrieving the extrinsic data element from the external repository.

19. The system of claim 16, the method further comprising:

the processor further querying a rule-logic cross reference in order to identify a first logical procedure; and the processor further obtaining an identification of the first logical procedure in response to the further querying; and the processor further associating the first rule with the first logical procedure, wherein the formatted instructions are a further function of information comprised by the first logical procedure.

20. The system of claim 19, wherein the form capable of directing a synchronization mechanism is a target message format that may be understood by the target system, and wherein the communicating comprises communicating a synchronization message to the target system that instructs the target system to revise the target data element by performing one or more steps of the first logical procedure.

* * * * *